(12) United States Patent
Seydoux

(10) Patent No.: US 8,068,884 B2
(45) Date of Patent: Nov. 29, 2011

(54) ACOUSTIC ECHO REDUCTION CIRCUIT FOR A "HANDS-FREE" DEVICE USABLE WITH A CELL PHONE

(75) Inventor: Henri Seydoux, Paris (FR)

(73) Assignee: Parrot, Paris (FR)

( * ) Notice: Subject to any disclaimer, the term of this patent is extended or adjusted under 35 U.S.C. 154(b) by 295 days.

(21) Appl. No.: 12/445,077

(22) PCT Filed: Aug. 10, 2007

(86) PCT No.: PCT/FR2007/001362
§ 371 (c)(1),
(2), (4) Date: May 28, 2009

(87) PCT Pub. No.: WO2008/049983
PCT Pub. Date: May 2, 2008

(65) Prior Publication Data
US 2010/0029345 A1    Feb. 4, 2010

(30) Foreign Application Priority Data
Oct. 26, 2006    (FR) ..................................... 06 09396

(51) Int. Cl.
*H04B 1/38*    (2006.01)
*H04M 1/00*    (2006.01)
*H04M 9/00*    (2006.01)
*H04M 9/08*    (2006.01)
*H04N 5/00*    (2011.01)

(52) U.S. Cl. ................. 455/570; 455/569.2; 379/388.01; 379/406.05; 379/406.01; 379/387.01; 348/611; 348/607

(58) Field of Classification Search .............. 379/406.01–406.16, 391–392.01; 348/611, 614, 607; 455/569.1–570, 63.1; 700/94; 381/66
See application file for complete search history.

(56) References Cited

U.S. PATENT DOCUMENTS

| 6,442,275 B1 | 8/2002 | Diethorn |
| 6,970,558 B1 | 11/2005 | Schmidt |
| 2002/0154761 A1* | 10/2002 | McLaughlin et al. ... 379/388.01 |
| 2004/0052358 A1* | 3/2004 | Lashley et al. .......... 379/387.01 |
| 2005/0286714 A1* | 12/2005 | Tokuda .................... 379/406.05 |

FOREIGN PATENT DOCUMENTS

| EP | 0596623 A2 | 5/1994 |
| JP | 60-102052 A | 6/1985 |
| JP | 2-209027 A | 8/1990 |
| WO | 96/26592 A | 8/1996 |
| WO | 0025441 A1 | 5/2000 |

* cited by examiner

*Primary Examiner* — Kent Chang
*Assistant Examiner* — Keith Fang
(74) *Attorney, Agent, or Firm* — Haverstock & Owens LLP

(57) ABSTRACT

A device comprising a circuit for picking up acoustic signals with the microphone; a circuit for playing back audio signals with an amplifier and a loudspeaker; an interface circuit for interfacing with a telephone network or a cell phone; and a circuit for digitally processing audio signals and reducing the acoustic echo that results from interaction of the loudspeaker with the microphone. The circuit for digitally processing audio signals comprises: an echo cancellation stage with an adaptive linear filter suitable for subtracting from the signal picked up by the microphone a reference signal that is derived from the signal received at the output from the interface; a gain control stage for suppressing the residual echo, and a stage for selectively reducing the background noise present in the signal received at the output from the echo suppression stage.

8 Claims, 1 Drawing Sheet

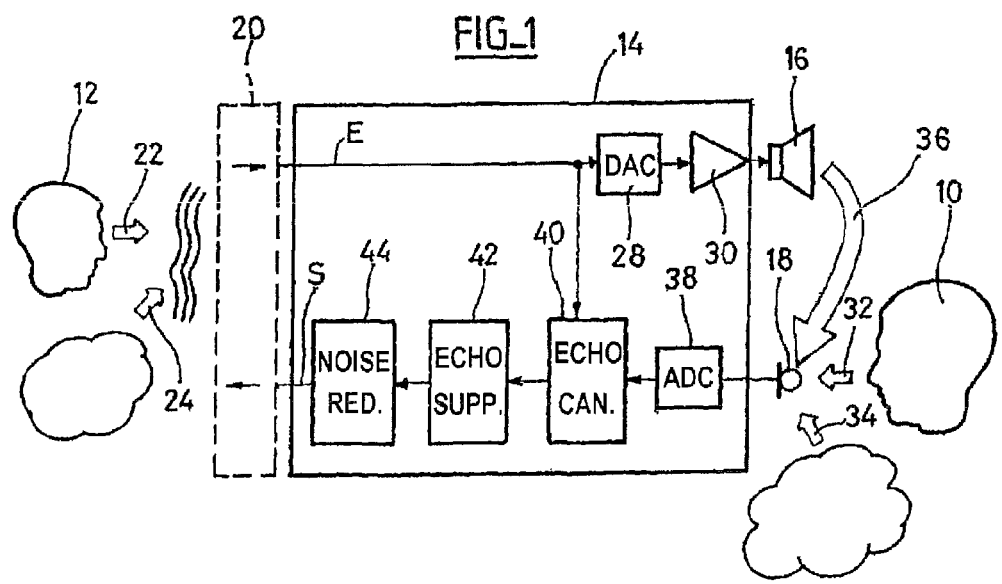
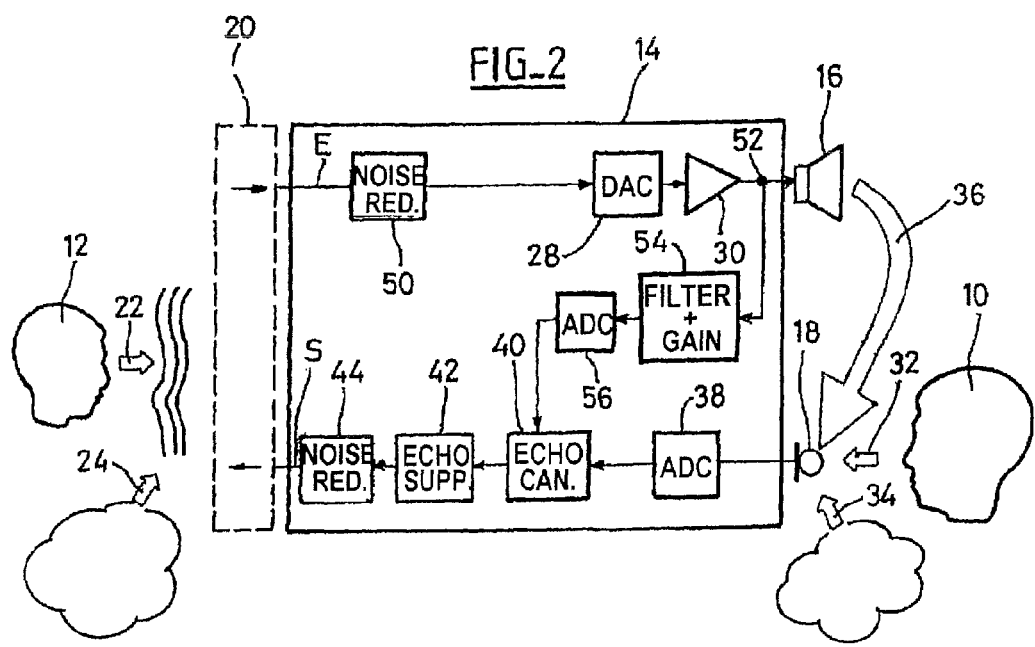

ACOUSTIC ECHO REDUCTION CIRCUIT FOR A "HANDS-FREE" DEVICE USABLE WITH A CELL PHONE

FIELD OF THE INVENTION

The present invention relates in general to the field of echo reduction in devices using audio signals picked up by a microphone, e.g. telephones, "hands-free" type adapters, and analogous devices. More particularly, the present invention relates to the field of eliminating acoustic echo.

BACKGROUND OF THE INVENTION

Echo can result from two phenomena of different kinds. The first type of echo is known as "line echo", being restricted to the transmission path and for which various filtering methods are known; the second type of echo is known as "acoustic" echo, being the echo that is actually picked up by the microphone and that is due to the phenomenon of reverberation in the environment of the speaker, typically the room the speaker is in or the cab of a vehicle.

Acoustic echo constitutes a major disturbance for the device, and it can often go so far as to make the speech of the near speaker (the speaker whose speech is embedded in the acoustic echo) to be incomprehensible for the remote speaker (the speaker at the other end of the telephone signal transmission channel).

These appliances include a sensitive microphone for picking up the speech of the near speaker, and a relatively powerful loudspeaker for reproducing the speech of the remote speaker while a telephone conversation is taking place. Nevertheless, because of acoustic coupling between those two transducers, the microphone picks up not only the voice of the near speaker, but also ambient noise and above all the acoustic echo, i.e. the reverberation of the sound reproduced by the loudspeaker—with the level thereof being made all the higher by the microphone and the loudspeaker being close together and with the acoustic power played back by the loudspeaker being high. This applies typically to systems on board a motor vehicle where the sound level for the loudspeaker is relatively high in order to cover ambient noise.

In addition, the considerable distance between the microphone and the near speaker gives rise to noise being at a relative level that is high, thus making it difficult to extract the useful signal that is embedded in the echo and in the noise. Furthermore, the noise presents spectral characteristics that are not steady, i.e. that vary unpredictably as a function of driving conditions: driving over deformed or cobbled roads, car radio in operation, etc., making it even more difficult to develop algorithms suitable for processing the signal.

In addition, many such devices are made in the form of independent appliances that are removable, comprising in a common box both the microphone and the loudspeaker, together with control buttons: the proximity (a few centimeters) of the loudspeaker and the microphone then gives rise to acoustic echo at a level that is considerable, typically of the order of twenty times the level of the speech signal produced by the near speaker.

Eliminating this acoustic echo is particularly difficult, in particular in very noisy environments that are typical of motor vehicle, where the ambient noise is added to the speech signal and the echo signal as picked up by the microphone.

Under such circumstances, prior art devices with the best performance implement: i) an echo cancellation stage; ii) an echo suppression stage; and iii) a noise reduction stage.

The echo cancellation stage models a linear transformation for converting the signal from the remote speaker (i.e. the signal that is to be reproduced by the loudspeaker) to the echo picked up by the microphone, so as to define an adaptive filter dynamically for application to the signal from the remote speaker. The result of the filtering is then subtracted from the signal picked up by the microphone, thereby having the effect of canceling the major portion of the acoustic echo.

After processing by the echo cancellation stage, the echo suppression stage serves to suppress the residual echo that remains present by attenuating the residual echo down to the level of the background noise. Whereas echo canceling is implemented essentially by a subtracter stage, echo suppression is performed by controlling gain, so it also acts on the useful signal picked up by the microphone (speech signal from the near speaker).

Finally, the noise reduction stage seeks to reduce the background noise picked up by the microphone, while preserving the speech from the near speaker. This noise reduction is advantageously performed dynamically and adaptively, by discriminating between periods of silence and of conversation in order to identify the noise, and then perform selective de-noising with appropriate attenuation.

JP-A-60 102052 and WO-A-96/26592 describe such circuits that are designed to reduce the incidence of the disturbing acoustic echo.

Nevertheless, those devices do not give complete satisfaction, in particular in appliances where the distance between the loudspeaker and the microphone is very small compared with the distance between the near speaker and the microphone: as a result, when the remote speaker is speaking, that speech is reproduced by the loudspeaker and is picked up in return by the microphone, typically with an echo level that may be as much as twenty times the mean level of the speech from the near speaker.

Furthermore, in particular because of the mobility of present cell phones, it frequently happens that the remote speaker is in an environment that is relatively noisy (street, office, restaurant, train, etc.), where the level of noise may be as much as one-tenth the level of the remote speaker's speech. This noise signal will itself be reproduced by the loudspeaker of the device and it will contribute to the acoustic echo. As a result, the level of such remote noise in the echo is of the same order as the level of speech from the near speaker, or is even higher.

Consequently, even after echo canceling, the residual echo coming from the remote noise (noise picked up beside the remote speaker) is no longer negligible and the echo suppression stage then applies considerable attenuation to the speech signal from the near speaker that is being transmitted to the remote speaker.

It should be observed that unlike speech, noise is present continuously beside the remote speaker (i.e. even when the remote speaker is not speaking), thereby giving rise to quasi-permanent attenuation of the speech signal transmitted from the near speaker to the remote speaker. The result can be improved only when the remote speaker remains silent for long enough to allow the echo cancellation stage to model a linear transformation of the noise signal from the surroundings of the remote speaker.

Furthermore, the echo cancellation stage, which is based on a linear filter, does not model any non-linear phenomena that might occur in the transmission system, in particular in the amplifier and the loudspeaker, nor does it model the electrical noise generated by the analog-to-digital converter circuit. Unfortunately those are phenomena that are not negligible in consumer products of low cost and small size.

Those non-linearities give rise to instability in the echo cancellation algorithm, which needs to re-adapt in a very short length of time.

The components that result from those non-linearities cannot be attenuated by the echo cancellation since they are not modelled. They can be reduced only by the echo suppression stage, thereby degrading the behavior of the device during double talking because of the attenuation of non-echo signals in the voice of the near speaker.

SUMMARY OF THE INVENTION

An object of the present invention is to solve those various difficulties and limitations by means of a device provided with a digital processor circuit that provides better performance in reducing the acoustic echo, in particular in the presence of non-linear phenomena and in the presence, beside the remote speaker, of noise that might affect echo cancellation, in particular in a double-talk situation. In particular, the invention can advantageously be applied to a "hands-free" device suitable for use in association with a cell phone, in particular an independent "handsfree" device that can be installed removably in a motor vehicle.

The device of the invention is of known type, comprising: a circuit for picking up acoustic signals, the circuit comprising a microphone and analog-to-digital converter means; a circuit for playing back audio signals, the circuit comprising digital-to-analog converter means, an amplifier, and a loudspeaker; a telephone network interface circuit, in particular a circuit for wirelessly interfacing a cell phone; and a circuit for digitally processing audio signals picked up by the microphone for application to the input of the interface means, and for processing audio signals received at the output from the interface means for playing back by the loudspeaker.

The circuit for digitally processing audio signals includes means for reducing the acoustic echo that results from interaction of the loudspeaker with the microphone, these means comprising: an echo cancellation stage comprising an adaptive linear filter suitable for subtracting from the signal picked up by the microphone a reference signal that is derived from the signal received at the output from the interface means for playing back by the loudspeaker; a suppression stage for suppressing the residual echo present at the output from the echo cancellation stage, the suppression stage comprising gain control means; and a noise reduction stage for selectively reducing the background noise present in the signal received at the output from the echo suppression stage.

In a manner characteristic of the invention, the device further comprises a filtering and digitizing stage receiving as input the signal that is applied by the amplifier to the loudspeaker, and delivering as output a corresponding filtered and digitized signal that is applied as a reference signal to the echo cancellation stage.

Preferably, the stage for selectively reducing the background noise present in the signal received at the output from the echo suppression stage comprises means for analyzing the time coherence of the signal, and suitable for determining an a priori probability for the presence/absence of speech from respective energy levels in the spectral domain, and for using said probability to estimate a noise spectrum and to derive a de-noised estimate of the received signal.

Most advantageously, the device further comprises a stage for selectively reducing the background noise present upstream in the signal received from the output from the interface means for application to the audio signal playback circuit, this stage preferably being of the same type as the stage for reducing the background noise present in the signal received at the output from the echo suppression stage.

In various preferred embodiments:
the adaptive linear filter of the echo cancellation stage comprises means for implementing an ATA type predictive algorithm;
the gain control means of the residual echo suppression stage are selective gain control means operating differently as a function of the frequencies of the received signal;
the filtering and digitizing stage comprises lowpass filter means and level-matching means; and
the circuits of the device are incorporated in a common box carrying the loudspeaker and the microphone that are located close to each other.

BRIEF DESCRIPTION OF THE DRAWINGS

There follows a description of an embodiment of the device of the invention given with reference to the accompanying drawings, in which the same numerical references are used from one figure to another to designate elements that are identical or functionally similar.

FIG. 1 is a block diagram showing the various stages involved in processing the signal in a prior art device.

FIG. 2 corresponds to FIG. 1, for the device of the present invention.

DETAILED DESCRIPTION OF THE INVENTION

With reference to FIG. 1, the description begins with the structure of a prior art device comprising echo cancellation means, echo reduction means, and noise reduction means.

The "hands-free" device is designed to enable telephone conversations to take place between two people, specifically a near speaker 10 and a remote speaker 12. The near speaker 10 is the speaker close to the "hands-free" device 14. The remote speaker 12 is the person with whom the near speaker is in telephone conversation.

The device 14 is typically a device installed in a motor vehicle, either permanently or removably. It possesses a loudspeaker 16 for reproducing the speech of the remote speaker, and a microphone 18 for picking up the speech of the near speaker 10. The device also includes interface means, represented diagrammatically at 20, for both-way transmission of signals over a telephone network, e.g. (but in non-limiting manner) a wireless interface of the Bluetooth type (trademark of Bluetooth SIG, Inc.) or of some other type enabling the device 14 to be coupled to the cell phone of the near speaker via which the near speaker is in radio telephone communication with the remote speaker.

The signal picked up beside the remote speaker 12 includes not only the speech 22 of the speaker, but also ambient noise 24, with both signals being mixed together in the signal that is transmitted to the near speaker, which signal is received via the input E of the device 14. This incident signal is applied to a digital-to-analog converter 28, and then to the input of an audio amplifier 30 that reproduces the signal via the loudspeaker 16.

The microphone 18 picks up an acoustic signal that comprises a combination of: i) the speech 32 of the near speaker 10; ii) ambient noise 38 in the speaker's environment (e.g. in the cab of the motor vehicle); and iii) the signal 36 as reproduced by the loudspeaker 16.

The signal 36 is an echo that is undesirable from the point of view of the microphone 18. As mentioned above, given the operating levels of the amplifier 30 and the large amount of coupling due to the loudspeaker 16 and the microphone 18 being close to each other, when the remote speaker 12 speaks, the level of the signal 36 may be as much as twenty times greater than the level of the speech signal 32 from the near speaker 10.

Furthermore, the level of noise in the echo signal 36 (mixing together the speech 32 of the remote speaker 12 and the noise 24 surrounding the remote speaker) can be considerable, since it often happens that the remote speaker is in a noisy environment. The level of this noise 24 may frequently be as great as about one-tenth the level of the speech signal 22, such that the level of noise in the echo 36 can be of the same order as the level of the speech signal 32 from the near speaker 10, or even higher (and this estimate ignores the noise 34 from the surroundings of the near speaker 10).

In present circuits that give the best performance, after the signal picked up by the microphone 18 has been digitized in an analog-to-digital converter stage 38, acoustic echo is reduced by three successive stages: i) echo cancellation 40; ii) echo suppression 42; and iii) noise reduction 44.

The echo cancellation stage 40 has essentially no effect on the speech from the near speaker 10. Echo cancellation consists in dynamically defining a compensation filter that receives as input the signal coming from the remote speaker (signal at the input E of the device) so as to subtract from the signals picked up by the microphone 18 an adapted signal that is representative of the received signal, so as to obtain a signal at the output from the stage 40 that no longer contains the parasitic echo.

The linear filter may be characterized by means of an echo suppression algorithm such as an algorithm of the affine projection algorithm (APA) type, or of the least mean squares (LMS) type, or of the normalized LMS (NLMS) type. Such an improved adaptive algorithm of the APA type is described for example in FR-A-2 792 146 (Parrot SA).

The echo cancellation performed by the stage 40 presents the advantage of not modifying the signals picked up by the microphone 18 and that are not constituted by the echo; the voice of the near speaker is thus intact after the echo cancellation stage 40.

Nevertheless, for various reasons (imperfect identification of the filter, approximate linear modeling, . . . ), it frequently happens that the echo remains audible after the echo cancellation stage 40.

The purpose of the echo suppression stage 42 is to suppress this residual echo, by attenuating the echo signal down to background noise level.

This echo suppressor stage is generally constituted by an automatic gain control stage operating either uniformly on all frequencies, or else selectively as a function of different frequency bands.

For reasonable levels of residual echo (the most usual circumstance), behavior during double talking is little affected, since it is relatively rare for speech from the remote speaker and the echo to be exactly synchronized, i.e. for both signals to present comparable energy levels at the same moment. The attenuation applied to the speech from the near speaker thus remains relatively moderate.

Finally, the purpose of the noise reduction stage 44 is to reduce the background noise picked up by the microphone, while preserving the speech 32 from the near speaker. This stage may in particular implement techniques such as those described by:

[1] Y. Ephraim and D. Malah, *Speech enhancement using a minimum mean-square error short-time spectral amplitude estimator*, IEEE Transactions on Acoustics, Speech, and Signal Processing, Vol. ASSP-32, No. 6, pp. 1109-1121, December 1984;

[2] Y. Ephraim and D. Malah, *Speech enhancement using a minimum mean-square error-log spectral amplitude estimator*, IEEE Transactions on Acoustics, Speech, and Signal Processing, Vol. ASSP-3, No. 2, pp. 443-445, April 1985; and

[3] I. Cohen and B. Berdugo, *Speech enhancement for non-stationary noise environments*, Signal Processing, Elsevier, Vol. 81, pp. 2403-2418, 2001.

Those noise reduction techniques work by discriminating between periods in which speech from the near speaker is present or absent. During periods identified as silences, the noise that is picked up is analyzed in its various frequency components so as to determine the energies of the frequency components having the most noise, and subsequently apply low gain to the noisy signal, while leaving intact components having little or no noise.

The signal as processed in this way is delivered on the output S for transmission to the remote speaker.

As shown in FIG. 2, the invention proposes modifying the structure of the above-described prior art device.

In a first aspect of the invention, prior de-noising processing is applied upstream to the signal coming from the remote speaker, before amplifying and using this signal as a reference for the echo cancellation stage.

This de-noising is performed by a stage 50 located between the input E of the circuit 14 and the converter 28.

De-noising has two purposes:

reducing the background noise present in the echo so as to improve the behavior of the echo cancellation stage: with the background noise in the echo reduced, the energy played back by the loudspeaker is less, thereby contributing correspondingly less to creating a permanent residual echo that would tend to attenuate the level of the speech signal from the near speaker; and improving listening quality for the near speaker, since the signal coming from the remote speaker is made more intelligible to the near speaker because of the de-noising of the played-back signal.

The additional noise reduction stage 50 located upstream may use an algorithm comparable to that of the noise reduction stage 44 located downstream and described above, i.e. implementing the mechanisms proposed by Ephraim and Malah in above-mentioned references [1] and [2]. In those techniques, the de-noising processing proper is performed in the frequency domain, with transfer from the time domain to the frequency domain and from the frequency domain to the time domain being performed by means of fast Fourier transforms with windowing and overlap. The de-noising makes use of a noise estimation module and a gain calculation module for each frequency band, with gain values being based on statistical models of speech and of noise, and on estimated parameters for those models.

In a second aspect of the invention, the reference used for the linear filter of the echo cancellation stage 40 is modified so as to eliminate non-linear phenomena.

To do this, instead of using the signal coming from the remote speaker as its reference for the echo cancellation stage 40, the device makes use of a signal taken from the output 52 of the amplifier 30, corresponding to the signal for application to the loudspeaker 16. When the reference signal for the echo cancellation stage 40 is taken from this point, it contains the saturation and other non-linearities that are generated by the amplifier, in particular when using a class B amplifier, where such an amplifier is relatively subject to distortion.

The reference signal also contains electrical background noise present at the output from the converter 28, noise that results in particular from imperfect shielding between the digital input and the analog output, as often happens in consumer products.

This reference signal is shaped and adapted by a filter and gain stage 54 and by an analog-to-digital converter stage 56. The stage 54 includes an analog lowpass filter and it applies gain of less than unity so as to adapt the level of the signal at the output from the amplifier to the level at the input to the converter 56; the lowpass filter eliminates inaudible high frequencies at the output from the amplifier (as are to be found in particular when using a class B amplifier), so as to avoid disturbing the operation of the converter 56.

The reference signal of the echo cancellation stage as defined in this way is a signal that is very close to the signal that is delivered by the loudspeaker 16 and that is therefore picked up by the microphone 18 in the echo 36. The linear filter of the echo cancellation stage 40 can thus be estimated with greater accuracy, since the adaptive filter is excited by a reference signal that already contains the major portion of the non-linearities in the audio system. Echo cancellation is thus considerably improved, and the residual echo is reduced accordingly. The attenuation subsequently introduced by the echo suppression stage 42 can therefore be less, with the result of better performance during double talking, the voice of the near speaker being correspondingly less attenuated.

The invention claimed is:

1. A "hands-free" device usable with a cell phone, in particular an independent device suitable for fitting in removable manner in a motor vehicle, the device comprising:
    a circuit for picking up acoustic signals, the circuit comprising a microphone (18) and analog-to-digital converter means (38);
    a circuit for playing back audio signals, the circuit comprising digital-to-analog converter means (28), an amplifier (30), and a loudspeaker (16);
    a telephone network interface circuit (20), in particular a circuit for wirelessly interfacing a cell phone; and
    a circuit for digitally processing audio signals picked up by the microphone for application to the input of the interface means, and for processing audio signals received at the output from the interface means for playing back by the loudspeaker;
    the circuit for digitally processing audio signals including means for reducing the acoustic echo that results from interaction of the loudspeaker with the microphone, these means comprising:
        an echo cancellation stage (40) comprising an adaptive linear filter suitable for subtracting from the signal picked up by the microphone a reference signal that is derived from the signal received at the output from the interface means for playing back by the loudspeaker;
        a suppression stage (42) for suppressing the residual echo present at the output from the echo cancellation stage, the suppression stage comprising gain control means; and
        a noise reduction stage (44) for selectively reducing the background noise present in the signal received at the output from the echo suppression stage;
    the device being characterized in that it further comprises:
        a filtering and digitizing stage (54, 56) receiving as input the signal that is applied by the amplifier (30) to the loudspeaker (16), and delivering as output a corresponding filtered and digitized signal that is applied as a reference signal to the echo cancellation stage (40).

2. The device of claim 1, wherein the stage (44) for selectively reducing the background noise present in the signal received from the output of the echo cancellation stage comprises means for analyzing the time coherence of the signal, suitable for determining an a priori probability for the presence/absence of speech from respective energy levels in the spectral domain, and for using said probability to estimate a noise spectrum and to derive a de-noised estimate of the received signal.

3. The device of claim 1, further comprising:
    a stage (50) for selectively reducing the background noise present in the signal received at the output from the interface means for application to the circuit for playing back audio signals.

4. The device of claim 2, wherein the background noise reduction stage (50) present upstream in the signal received at the output from the interface means comprises means for analyzing the time coherence of the signal and suitable for determining an a priori probability for the presence/absence of speech from respective energy levels in the spectral domain, and for using said probability to estimate a noise spectrum and to derive a de-noised estimate of the received signal.

5. The device of claim 1, wherein the adaptive linear filter of the echo cancellation stage (40) comprises means for implementing an APA type predictive algorithm.

6. The device of claim 1, wherein the gain control means of the residual echo suppression stage (42) are selective gain control means operating in different manners as a function of the frequencies of the received signal.

7. The device of claim 1, wherein the filtering and digitizing stage (54) comprises lowpass filter means and level matching means.

8. The device of claim 1, wherein the circuits of the device are incorporated in a common housing (14) carrying the loudspeaker (16) and the microphone (18) that are placed close to each other.

* * * * *